No. 813,511.  
PATENTED FEB. 27, 1906.
J. O. NEIKIRK.  
BRAKE OPERATING MECHANISM FOR CARS.  
APPLICATION FILED AUG. 5, 1905.
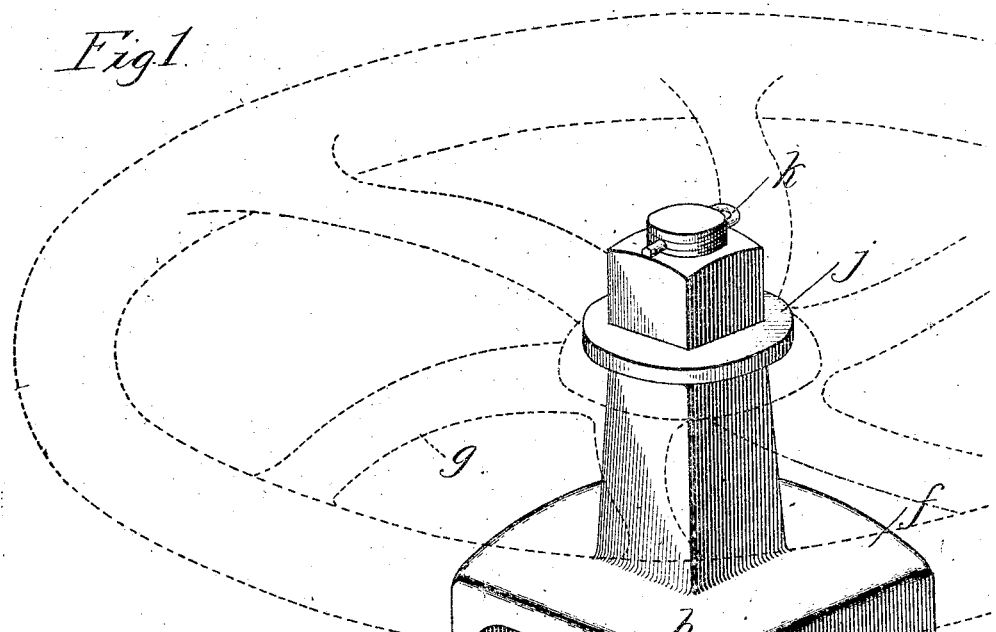
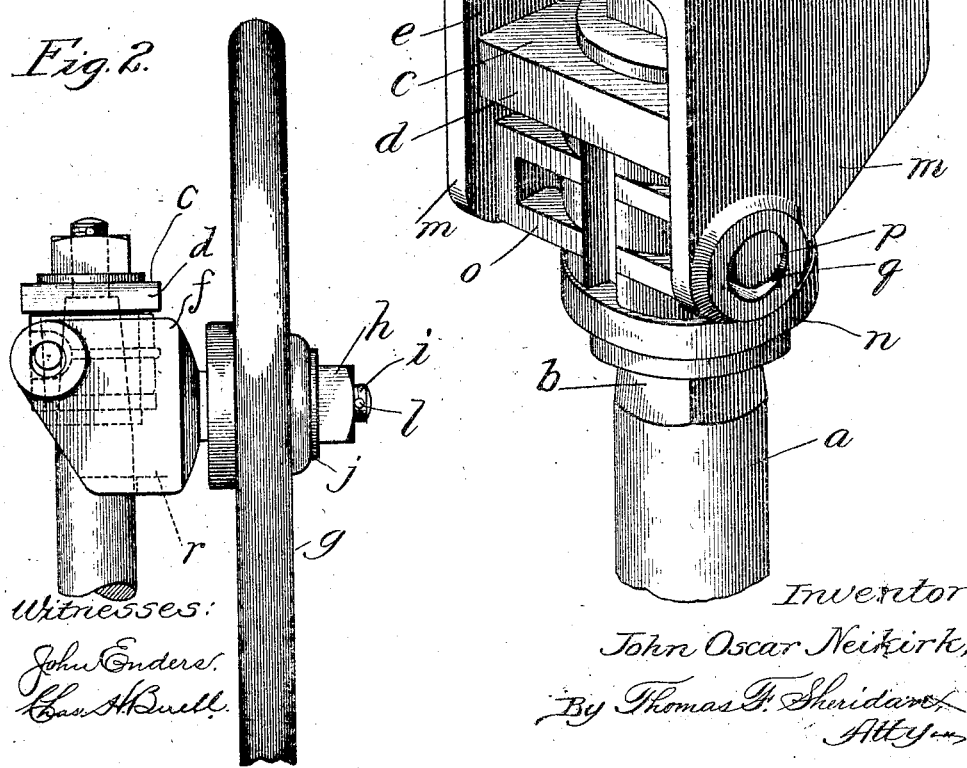
Witnesses:  
John Enders  
Chas. H. Buell
Inventor  
John Oscar Neikirk,  
By Thomas F. Sheridan,  
Atty.

UNITED STATES PATENT OFFICE.

JOHN OSCAR NEIKIRK, OF CHICAGO, ILLINOIS.

BRAKE-OPERATING MECHANISM FOR CARS.

No. 813,511.   Specification of Letters Patent.   Patented Feb. 27, 1906.

Application filed August 5, 1905. Serial No. 272,937.

*To all whom it may concern:*

Be it known that I, JOHN OSCAR NEIKIRK, a citizen of the United States, residing at Chicago, in the county of Cook and State of Illinois, have invented certain new and useful Improvements in Brake-Operating Mechanisms for Cars, of which the following is a specification.

My invention relates to that class of brake-operating mechanisms having a brake-shaft or staff operatively connected with the brake in any ordinary and well-known manner and provided with an operating-wheel mounted thereon or connected therewith in such a manner as to be rotatable or have an orbital movement with relation to the shaft when out of operative position and adapted to operatively engage and rotate the shaft when in raised or operative position.

The principal object of my invention is to provide a simple, economical, and efficient brake-operating mechanism for cars.

A further object of the invention is to provide means for connecting the operating-wheel with the brake-shaft, so as to permit the rotation or orbital movement of the wheel with relation to the shaft when out of operative position and enable the wheel to be readily moved into and out of operative engagement with the shaft.

Other and further objects of the invention will appear from an examination of the drawings and the following description and claims.

The invention consists in the features, combinations, and details of construction hereinafter described and claimed.

In the accompanying drawings, Figure 1 is a perspective view of a brake-operating mechanism constructed in accordance with my improvements, showing the brake-wheel in raised operative position or in position to rotate the brake-shaft; and Fig. 2, a view in elevation, showing the wheel in lowered position with its axis at an angle to the axis of the shaft and in position to permit the independent rotation of the shaft or independent orbital movement of the wheel with relation to the shaft.

In constructing a brake-operating mechanism in accordance with my improvements I provide a brake-shaft $a$, which may be of the ordinary and well-known type and is operatively connected with the brake mechanism of a car to be operated in any ordinary known manner. The end of the brake-shaft is provided with a squared or angular tapered end portion $b$. Upon the squared end of the shaft is mounted a non-rotatable shouldered sleeve member $c$, having a squared tapered axial perforation or central opening corresponding to the form of the squared and tapered end of the shaft upon and in fixed relation to which such shouldered sleeve member is mounted. The upper portion of the non-rotatable sleeve member $c$ is square or angular on the outside as well as the inner side thereof, and its lower portion is round or cylindrical, so as to permit the supporting-sleeve $o$, hereinafter described, to rotate thereon. This enables an ordinary brake-shaft or staff with the ordinary squared and tapered end to be employed and provided with my improvements. The side surfaces $d$ of the upper squared portion of this non-rotatable sleeve $c$ extend at an angle with relation to each other, preferably at right angles, and are adapted to engage the inner surface portions $e$ of a supporting-bracket $f$. This supporting-bracket is secured to the operating-wheel $g$ by means of a nut $h$, mounted upon and in threaded engagement with its threaded end portion $i$. The upper neck portion of the bracket extends through the axial perforation of the wheel, being squared, so as to prevent the rotation of the wheel with relation to the bracket, and a washer $j$ may be interposed between the securing-nut and the wheel, the nut being also further secured by means of a cotter-pin $k$, which extends through a perforation $l$ in the threaded end of the supporting-bracket. The supporting-bracket is provided with parallel side portions $m$, the inner surfaces of which are adapted to engage the sides or shoulders of the operating shouldered sleeve member $c$ when the bracket and wheel are in raised operative position and may be moved out of engagement with such shoulder mechanism or squared sleeve by being lowered to a position below the squared or shouldered portion thereof. In order to accomplish this, the shaft is provided with a supporting-sleeve $n$, mounted in fixed relation thereto and forming an annular supporting-shoulder or supporting member, and between this supporting-sleeve and the shouldered portion of the non-rotable sleeve member $c$ is rotatably mounted a supporting-sleeve $o$. This rotatable sleeve $o$ encircles the non-rotatable sleeve member $c$ and may be in the form of a split sleeve. It is provided with preferably integral trunnion portions $p$, adapted to be snapped into perforations or bearings $q$ in the side portions $m$ of the bracket. The bracket is thus pivotally supported upon the rotatable sleeve, so as to swing in a vertical plane into and out of operative position and in a horizontal plane when in lowered or inoperative position. The side portions of the bracket are made of sufficient length so that the brake-operating wheel may be thrown to the opposite side of the shaft from that upon which the pivot-pin $p$ extends, so that when the brake-operating wheel is lowered to the position shown in Fig. 2 it is as near as possible to the shaft, thus occupying the minimum of space. When in lowered position, the bracket which supports the wheel is entirely below the shouldered portion of the sleeve member $c$, and the parts are thus in position to permit the rotation of the shaft, while the brake-operating wheel and its supporting-bracket member are stationary. The brake-operating wheel and its supporting-bracket member may also when in this position be moved orbitally with relation to the shaft, such movement being permitted by the rotatable sleeve, which supports the bracket and wheel thereon. This orbital movement of the wheel while out of operative position enables it to be moved to any desired position which conditions may require, so as to occupy the minimum amount of space. The wheel may be raised into operative position and into operative engagement with the shaft by swinging it upward upon its horizontal pivots or trunnions when the pivotal center is at right angles with the side portions of the shouldered member $c$, which are to engage the adjacent inner sides of the bracket member.

The bracket member may be inclosed on three sides. In other words, it may have a wall portion $r$, (indicated by the dotted line in Fig. 2,) adapted to engage the shouldered member when the wheel is in raised position, so that the axial center of the wheel will be supported substantially in alinement with the axial center of the shaft when in raised operative position and at the same time be capable of being readily swung to lowered position with its axial center at an angle to the axis of the shaft and in position to permit the independent movement of the wheel and shaft. Although a lever can be used under some circumstances in place of a wheel, I find it generally preferable to use a brake-operating wheel of the ordinary type.

I claim—

1. In an apparatus of the class described, the combination of a brake-shaft adapted to be operatively connected with the brake mechanism of a car, a shouldered sleeve mounted upon the shaft in non-rotatable relation thereto, and shaft-operating mechanism mounted in rotatable relation to the shaft movable into and out of engagement with the shouldered sleeve and adapted to be held in non-rotatable relation to the shaft thereby.

2. In an apparatus of the class described, the combination of a brake-shaft adapted to be operatively connected with the brake mechanism of a car, a brake-shaft-operating wheel, a bracket mounted in fixed relation to such operating-wheel, a shouldered sleeve member operating shoulder mechanism upon the shaft in non-rotatable relation thereto, rotatable supporting-sleeve mechanism encircling the shouldered sleeve member and pivotally connected with such bracket adapted to permit the bracket to be moved into and out of operative engagement with the shouldered sleeve member and permit the rotation of the bracket with relation to the shaft when in lowered position.

3. In an apparatus of the class described, the combination of a brake-shaft provided with a squared end portion, a lower supporting-sleeve and an upper shouldered sleeve mounted in non-rotatable relation to such shaft, a supporting-sleeve rotatably mounted between the shouldered portion of the upper shouldered sleeve and the lower sleeve, bracket mechanism pivotally connected with such rotatable sleeve, and an operating-wheel mounted upon and movable with such bracket mechanism.

4. In an apparatus of the class described, the combination of a brake-shaft provided with a squared end portion, a sleeve provided with a lower annular portion and an upper squared or shouldered portion mounted in non-rotatable relation to the squared portion of such shaft, a sleeve rotatably mounted upon the annular portion of such shouldered sleeve, a bracket pivotally connected with such rotatable sleeve, and an operating-wheel mounted upon and movable with such bracket into and out of operative position.

5. In an apparatus of the class described, the combination of a brake-shaft provided with shoulder mechanism thereon, a supporting-sleeve rotatably mounted upon such shaft adjacent to the shoulder mechanism, a bracket pivotally connected with such rotatable sleeve and provided with side portions movable into and out of engagement with the shoulder mechanism of the shaft, and a brake-shaft-operating member mounted upon such pivoted bracket and movable therewith.

6. In an apparatus of the class described, the combination of a brake-shaft, a split sleeve rotatably mounted and provided with integral trunnions, a bracket provided with perforations for receiving such trunnions and pivotally mounted upon such split-sleeve member, operating-shoulder mechanism in fixed relation to the brake-shaft, and an operating-wheel mounted upon and movable with the bracket, such bracket being adapted to engage the operating-shoulder mechanism of the shaft when in raised position and being rotatable with relation to the shaft when in lowered position.

7. In an apparatus of the class described, the combination of a brake-shaft provided with a squared end portion and an annular supporting-shoulder portion, a shouldered operating-sleeve mounted upon and in fixed relation to such shaft and having an outer annular bearing portion, a supporting-sleeve rotatably mounted upon the annular bearing portion of such shouldered operating-sleeve, a bracket pivotally connected with the rotatable sleeve and movable into and out of engagement with the shouldered operating-sleeve, and a brake-wheel mounted upon and movable with such bracket.

JOHN OSCAR NEIKIRK.

Witnesses:
HARRY I. CROMER,
A. L. SAVOIE.